United States Patent [19]

Sato

[11] Patent Number: 4,605,233
[45] Date of Patent: Aug. 12, 1986

[54] MAGNETIC FLUID SEALING DEVICE

[75] Inventor: Kimio Sato, Tokyo, Japan

[73] Assignee: Rigaku Keisoku Kabushiki Kaisha, Musashi-Murayama, Japan

[21] Appl. No.: 531,704

[22] Filed: Sep. 13, 1983

[30] Foreign Application Priority Data

Sep. 16, 1982 [JP] Japan ............... 57-159662

[51] Int. Cl.⁴ .............................. F16J 15/40
[52] U.S. Cl. ........................... 277/80; 277/135
[58] Field of Search ................... 277/80, 135

[56] References Cited
FOREIGN PATENT DOCUMENTS 653470 3/1979 U.S.S.R. ............... 277/80
723281 3/1980 U.S.S.R. ............... 277/80

Primary Examiner—Charles Frankfort
Attorney, Agent, or Firm—Kenyon & Kenyon

[57] ABSTRACT

A magnetic fluid sealing device has a housing, a shaft accommodated in the housing, a plurality of permanent magnets disposed, in series, coaxially with each other, and polepieces disposed between the two adjoining magnets. The polepieces have one or more concave grooves to form a plurality of knife edges for concentrating magnetic flux. The density of magnetic flux passing through the edge or edges located adjacent to a vacuum environment is more increased than that through other edges.

7 Claims, 5 Drawing Figures

MAGNETIC FLUID SEALING DEVICE

BACKGROUND OF THE INVENTION

This invention relates to a magnetic fluid sealing device for sealing relatively movable surfaces of rotating shafts, sleeves and the like to maintain a pressure difference across seals or to prevent leakage of a lubricant along the surfaces.

In relatively moving surfaces which may be lubricated, it is sometimes necessary to interpose seals therebetween to prevent leakage of a lubricant or gas or to maintain a pressure difference across the seals where one of the surfaces such as a rotating shaft passes from one environment at a first pressure into a second environment at another pressure.

As such seals, it has been suggested that magnetic fluid be employed in the gap between relatively movable surfaces. The magnetic fluid comprises a carrier fluid such as water, a hydrocarbon, a fluorocarbon, or a fatty acid and magnet-type particles such as ferrite mixed in the carrier, and is captured in the gap by magnetic flux generated by one or more permanent magnets. In such a magnetic fluid seal, as the relatively movable surfaces do not directly contact each other, they are subject to hardly any wear, whereby the serviceable life of the seal is remarkably extended in comparison with those of mechanical seals. In addition, it provides a positive seal. Therefore, the magnetic fluid seal is often applied to an apparatus used in the environment of a high vacuum such as an X-ray tube apparatus.

Magnetic fluid sealing devices of this kind are disclosed in British Pat. No. 783,881 and U.S. Pat. No. 3,620,584. In FIG. 5 of the British patent, a shaft of magnetic material is rotatably accommodated in a housing. A plurality of annular permanent magnets are fixed to the inner surface of the housing in series in the longitudinal direction of the housing with annular polepieces, each being held between two adjoining permanent magnets. Between each of the inner peripheries of the polepieces and the outer surface of the shaft are formed sealing gaps in which the magnetic fluid is entrapped and retained. The two adjoining permanent magnets on opposite sides of each of the polepieces are so arranged that their polarities are symmetrical with respect to that polepiece, that is, the permanent magnets are arranged in the sequence of "N.S-polepiece-S.N-polepiece-N.S". This arrangement of the permanent magnets is the same as that of the present invention as described hereinafter. In addition, each of the inner peripheries of the polepieces is bevelled so as to form an annular upheaved portion in its central portion in the axial direction of the polepieces thereby to provide the desired concentration of the magnetic field. Magnetic flux generated from one of the magnets passes through one of polepieces across one of the gaps and through the shaft and back through another gap and polepiece to the magnet to complete a magnetic flux circuit.

The two magnetic flux flows generated from two adjoining permanent magnets in each polepiece pass across each gap through the upheaved portion of the polepiece in the same direction, and accordingly the two magnetic flux flows repulse each other to diverge and provide a relatively wide magnetic field for holding the magnetic fluid in the gap. Furthermore, to avoid magnetic saturation of the polepieces, the thickness of each polepiece is limited, and a very thin plate cannot be used as a polepiece.

Therefore, as the magnetic flux density in the gaps between the inner peripheries of the polepieces and the circumferential surface of the rotating shaft is not very high, the holding force, for holding the magnetic fluid, generated by the magnetic flux passing through each gap is not very great. To increase the holding force, it is necessary to use one or more magnets with strong magnetic field or to form narrow gaps, for example, of less than 20μ. Accordingly, it is difficult to assemble the sealing device so as to maintain narrow gaps between the rotating shaft and the polepieces. In addition, if the number of permanent magnets is increased to increase the number of barriers to confine the magnetic fluid, the sealing device will become large and bulky.

In the U.S. Pat. No. 3,620,584, a magnetic fluid sealing unit is positioned between two ball bearings as shown in FIG. 5 of its accompanying drawings. The fluid sealing unit comprises an annular permanent magnet and two polepieces on opposite sides of the magnet. The inner periphery of each polepiece is concave in the shape of a triangule in radial section of the annular polepiece so as to form two knife edges on opposite ends of its inner periphery in the axial direction of the sealing unit. Magnetic fluid is held within each gap between its concave periphery and a rotating bushing. In this sealing unit, there is no special means to concentrate the magnetic flux passing through the gap, and accordingly the density of the magnetic flux in the gap is not very high. This type of the sealing unit cannot provide a complete seal to maintain a great pressure difference between two adjoining environments.

In order to increase the effective pressure difference, a plurality of polepieces each having a knife edge, defining a sealing gap, opposite to the rotating bushing may be disposed on opposite sides of the permanent magnet as shown in FIG. 6. In this design, a plurality of sealing barriers of magnetic fluid are separately formed in the axial direction of the bushing. FIG. 7 in the same patent discloses a rotating bushing having a plurality of knife edges to form a plurality of sealing barriers for the same purpose as the sealing device in FIG. 6.

In these prior examples, the magnetic flux is moderately concentrated at the knife edges of the polepieces or the bushing. However, the degree of its concentration is not enough for the sealing devices to maintain a great pressure difference in spite of only a small number of sealing barriers.

Furthermore, in these prior examples, each barrier formed by magnetic fluid is adapted to maintain almost the same pressure difference. However, as each barrier is not strong enough if these prior examples are used in the environment of a high vacuum, it is likely that air between the adjoining barriers in those devices leaks into the vacuum environment. That is, these prior examples can maintain a certain degree of pressure difference as a whole. However, air held between the adjoining barriers is apt to leak into the vacuum environment. Accordingly, a high vacuum environment cannot be created by those prior examples.

SUMMARY OF THE INVENTION

It is an object of this invention to provide a magnetic fluid sealing device in which a locally strong magnetic field is generated by a repulsive force between two different flux flows passing through the same polepiece and air held between two adjoining sealing barriers in the sealing device does not leak into a vacuum environment thereby to increase the force for holding the magnetic fluid and to maintain a high pressure difference with only a small number of sealing barriers.

According to this invention, there is provided a magnetic fluid sealing device for sealing relatively movable members to maintain a pressure difference between a low pressure environment such as a vacuum environment and a high pressure environment such as an atmospheric pressure environment, comprising: a housing; a shaft of magnetic material relatively rotatable with respect to the housing and accommodated therein; a plurality of permanent magnets each having a central hole through which the shaft passes and disposed, in the housing, coaxially with one another in series so that the polarity of the opposite surfaces of two adjoining magnets in the same; and a plurality of polepieces each having a central hole through which the shaft passes, and disposed in such a manner that each polepiece is adjacent to each magnet, the polepiece having at least one concave groove on its inner periphery defining the central hole so as to form a plurality of knife edges in the axial direction of the shaft, between each knife edge and the outer surface of the shaft being formed a sealing gap in which magnetic fluid is captured or retained to form a barrier for maintaining the pressure difference, the magnetic fluid sealing device being so adapted that the density of magnetic flux passing through the gap or a group of gaps located adjacent to the low pressure environment is much higher than that of magnetic flux passing through other gaps.

The nature, utility, and further features of this invention will be more clearly apparent from the following detailed description with respect to a preferred embodiment of the invention when read in conjunction with the accompanying drawings.

BRIEF DESCRIPTION OF THE DRAWINGS

In the accompanying drawings

DETAILED DESCRIPTION OF THE INVENTION

Figure 1:
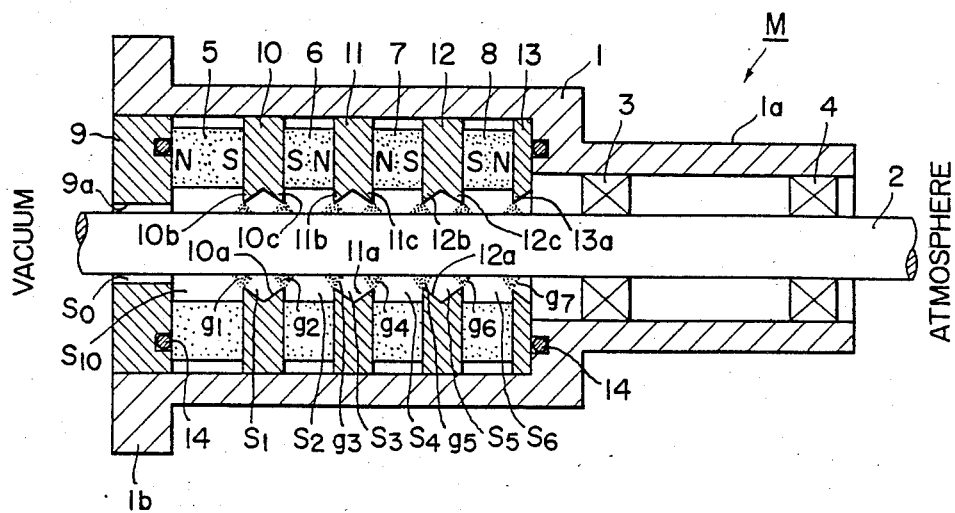
FIG. 1 is a side view, in longitudinal section, of an embodiment of the device according to this invention.

Referring first to FIG. 1, a magnetic sealing device M, according to this invention, has a cylindrical housing 1 and a magnetic rotating shaft 2 inserted through the central portion of the housing 1 in its axial direction. The left end of the shaft 2 is disposed in a vacuum environment and the right end thereof is disposed in a normal atmospheric environment as viewed in FIG. 1. The housing 1 is provided with a cylindrical end portion 1a projecting coaxially from an end face of the housing 1. In this end portion 1a, two ball bearings 3 and 4 are disposed at positions spaced apart in its axial direction to rotatably hold the rotating shaft 2.

In the housing 1 are alternately disposed in series in its axial direction a plurality of annular permanent magnets 5, 6, 7 and 8 and a plurality of annular polepieces 9, 10, 11, 12 and 13. Each of the magnets and the polepieces have central holes respectively through which the shaft 2 passes. The permanent magnets 5 through 8 are so arranged, in general, that the polarity of two permanent magnets on opposite sides of each polepiece is symmetrical with respect to each polepiece. That is, the polarity of the opposite surfaces of two adjoining magnets is the same each other, and more concretely, the magnets and polepieces are successively disposed in the sequence of "polepiece-N.S-polepiece-S.N-polepiece".

The polepiece 9 is so disposed that its left end face is flush with the end face of the flange 1b of the housing 1. The polepiece has a hole 9a at its central portion through which the shaft 2 passes. The polepiece 13 disposed at the right end of the housing 1 has a knife edge 13a at its inner periphery.

Furthermore, two sealing rings 14 and 14 are provided between the polepiece 9 and magnet 5 and between the polepiece 13 and the inner end face of the housing 1, respectively.

Figure 2A:
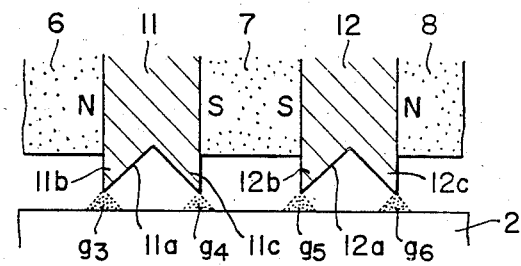
FIG. 2A is an enlarged fragmentary side view, in longitudinal section, of first essential parts in FIG. 1.
Figure 3:
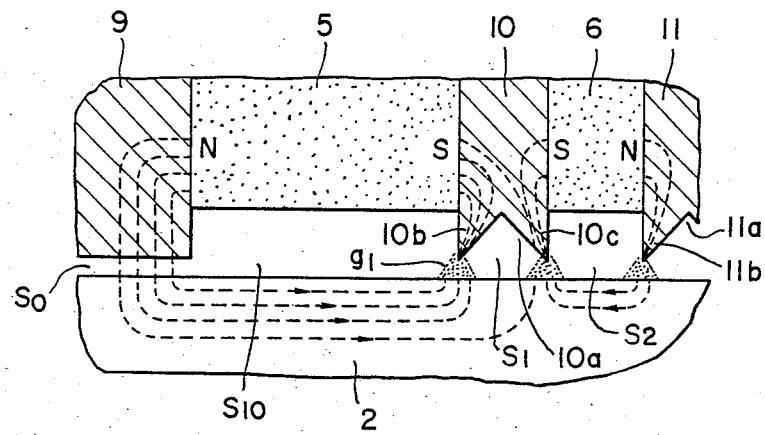
FIG. 3 is an enlarged fragmentary side view, in longitudinal section, of second essential parts shown in FIG. 1.

The inner peripheries of the polepieces 10, 11 and 12 are respectively provided with V-shaped annular concave grooves 10a, 11a and 12a so as to form respective knife edges 10b, 10c . . . 12c at the flanks or the ends of the inner peripheries in the axial direction of the housing 1 or shaft 2 as shown in FIGS. 1, 2A and 3. Sealing gaps $g_1$, $g_2$, . . . and $g_7$ are formed between the knife edges $10_b$, $10_c$, $11_b$, $11_c$, $12_b$, $12_c$ and $13_a$ and the cylindrical surface of the shaft 2, in which gaps magnetic fluid is captured to form sealing barriers to maintain the pressure difference between the above mentioned environments on the two sides of the rotating shaft 2.

Figure 2B:
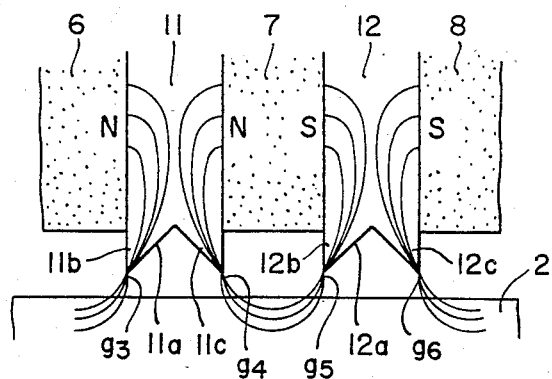
FIG. 2B is a schematic view showing the distribution of magnetic flux in each portion in FIG. 2A.

The distribution of the magnetic flux generated by two adjoining permanent magnets is as shown in FIGS. 2B and 3. That is, the magnetic flux from the N pole of the permanent magnet 6 on the left side as viewed in FIG. 2B passes through the knife edge $11_b$ of the polepiece 11 and across the gap $g_3$ to flow into the surface portion of the shaft 2. On the other hand, the magnetic flux from the N pole of the permanent magnet 7 in the center as viewed in FIG. 2B passes through the knife edge $11_c$ of the polepiece 11 and across the gap $g_4$ to flow into the shaft 2, and then across the gap $g_5$ to flow into the knife edge $12_b$ of the polepiece 12. The two magnetic flux flows generated from the two different magnets 6 and 7 in the polepiece 11 have the same positive polarities, and accordingly they repulse each other to be separated toward the knife edges $11_b$ and $11_c$ respectively, and concentrated thereon. The concentration of the magnetic flux flows results in increasing the holding force for holding the magnetic fluid in the gaps $g_3$ and $g_4$.

In the polepiece 12, the magnetic flux generated from the permanent magnet 7 and the magnetic flux generated from the permanent magnet 8 repulse each other to be separated and concentrated on respective knife edges $12_b$ and $12_c$ of the polepiece 12. Accordingly, the density of magnetic flux passing across each gap becomes very high to remarkably increase the force holding for the magnetic fluid so as to completely maintain a vacuum on the left side of the shaft 2. Furthermore, even if the device is so arranged that the gaps are relatively wide, for example 30 to 50μ, it is possible to maintain a relatively great pressure difference whereby the arrangement of the shaft 2 and each polepiece is facilitated. In addition, even if the number of permanent magnets to be used is decreased, it is possible to maintain a relatively great pressure difference, and accordingly, useful devices of small size can be manufactured.

FIG. 3 shows a distribution of the magnetic flux in the area adjacent to the vacuum environment on the left side of the device. The magnet 5 disposed in the leftest position of the magnet and polepiece arrangement, being of greater width, has a magnetic force greater than each of other magnets 6 through 8. The magnetic flux flows as indicated by arrows to concentrate in the knife edge $10_b$. That is, the magnetic flux generated from the N pole of the magnet 5 passes through the space $S_0$ to enter the outer surface of the shaft 2 and then passes through the gap $g_1$ to enter the polepiece 10 to come back to the S pole of the magnet 5. At this time, the density of the magnetic flux passing through the gap $g_1$ becomes very high so that the magnetic flux can hold a great amount of magnetic fluid therein. Therefore, air held in a space $S_1$ between the adjoining gaps $g_1$ and $g_2$ is effectively prevented from leaking into a vacuum space $S_{10}$.

In general, the more the number of the barrier increases, the more pressure difference the sealing device can maintain. The sealing device according to this invention can provide a high vacuum of $10^{-7}$ or $10^{-8}$ torr. In the sealing device of this type, it is a significant problem that air held between the two barriers (corresponding to the gaps $g_1$ and $g_7$) formed at the extreme ends of a barrier arrangement may leak into the vacuum space $S_{10}$.

To solve this problem, in this invention, the leftest barrier at the gap $g_1$ which is adjacent to the vacuum space $S_{10}$ is formed much stronger than other barriers, thus providing a stronger sealing effect adjacent the vacuum spaces S10.

Suppose that the sealing device M would maintain 1 atmospheric pressure difference between a high vacuum and 1 atmospheric pressure. The sealing device has 7 barriers and 6 spaces $S_1$ to $S_6$ between the adjoining barriers. According to various experiments, it is understood that each barrier can maintain almost equal pressure difference. That is, in this case, each barrier can maintain a pressure difference of 1/7 atmospheric pressure. Accordingly, the pressures of the spaces $S_1$, $S_2$, $S_3$, $S_4$, $S_5$ and $S_6$ are 1/7, 2/7, 3/7, 4/7, 5/7 and 6/7 atmospheric pressures, respectively.

When the shaft 2 is rotated, each barrier may oscillate due to the rotation of the shaft 2 whereby air held in each space is apt to leak into the adjoining space. In this case, as the leftest barrier at the gap $g_1$ is strong enough to maintain 1/7 atmospheric pressure, the leakage of an air into the vacuum environment from each space is effectively avoided. Accordingly, the device can provide a high vacuum without increasing the size of the device.

Figure 4:
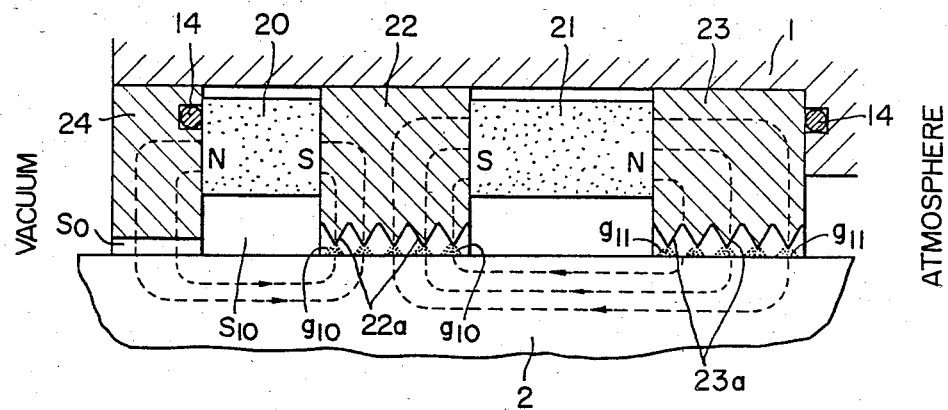
FIG. 4 is an enlarged fragmentary side view, in longitudinal section, of another embodiment according to this invention.

FIG. 4 shows another embodiment of this invention. In the housing 1 are alternately disposed in series in its axial direction two annular permanent magnets 20 and 21 and three polepieces 22, 23 and 24. Each of the magnets and polepieces has a central hole respectively through which the shaft 2 passes. The magnets 20 and 21 are so arranged that the S pole of the magnet 20 is opposite to the S pole of the adjoining magnet 21 via the polepiece 22.

The polepieces 22 and 23 have a group of knife edges 22a and 23a, respectively, and each group has more than two edges. A group of gaps $g_{10}$ are formed between each knife edge 22a and the shaft 2 and a group of gaps $g_{11}$ are formed between each knife edge 23a and the shaft 2.

In this embodiment, magnetic flux flows as indicated by arrows. That is, only magnetic flux generated from the N pole of the magnet 21 flows through the polepiece 23 which is located on the side of the atmospheric pressure environment. However, two magnetic fluxes generated from both of magnets 20 and 21 pass through, in parallel, the polepiece 22 facing the vacuum space $S_{10}$.

If two polepieces 22 and 23 are of the same size, the density of the magnetic flux passing across the gaps $g_{10}$ is much higher than that of the magnetic flux passing across the gaps $g_{11}$. Accordingly, magnetic fluid is held steadily in each gap $g_{10}$ to prevent air accommodated between two adjoining barriers formed at the gaps $g_{10}$ from leaking into the vacuum space $S_{10}$. That results in providing a high vacuum without increasing the size of the sealing device.

In FIG. 1, each polepiece has two knife edges. However, instead of each polepiece having two knife edges, a plurality of polepieces each having more than two knife edges as shown in FIG. 4 can be used.

In addition, in FIG. 4, each polepiece has more than two knife edges. However, two polepieces having two knife edges as shown in FIG. 1 can be substituted for the polepiece as shown in FIG. 4.

What is claimed is:

1. A magnetic fluid sealing device comprising a housing disposed between a low pressure environment and a high pressure environment:

a shaft of magnetic material rotatably mounted in said housing;

a plurality of annular permanent magnets mounted in said housing coaxially of each other with the polarity of the opposite surfaces of two adjoining magnets being the same;

a plurality of annular pole pieces mounted in said housing in alternating manner with said magnets, each pole piece having at least one annular knife edge on an inner periphery facing said shaft, each said knife edge being disposed to pass magnetic flux from an adjacent magnet to capture a ring of magnetic fluid between said shaft and said respective knife edge and form a barrier to maintain a pressure difference between the low pressure environment and the high pressure environment; and wherein said magnet closest to the low pressure environment generates a greater magnetic flux density in said one knife edge of an adjacent pole piece than the other of said magnets in respective said pole pieces, thus providing a stronger sealing effect adjacent said low pressure environment.

2. A magnetic fluid sealing device as set forth in claim 1 which comprises two of said pole pieces and two of said magnets with the pole piece between said two magnets being closer to the low pressure environment than the other of said pole pieces.

3. A magnetic fluid sealing device as set forth in claim 2 wherein each pole piece has two knife edges.

4. A magnetic fluid sealing device as set forth in claim 1 wherein each knife edge is disposed at a flank of a respective pole piece.

5. A magnetic fluid sealing device as set forth in claim 1 wherein said magnet closest to the low pressure environment is of greater width than the remaining magnets.

6. A magnetic fluid sealing device comprising a housing disposed between a low pressure environment and a high pressure environment;

a shaft of magnetic material rotatably mounted in said housing;

a plurality of annular permanent magnets mounted in said housing coaxially of each other with the polarity of the opposite surfaces of two adjoining magnets being the same;

a plurality of annular pole pieces mounted in said housing in alternating manner with said magnets, each pole piece having a pair of annular knife edges on an inner periphery facing said shaft to define gaps therewith for the passage of magnetic flux therethrough to capture a ring of magnetic fluid between each knife edge and said shaft; and wherein said magnet closest to the low pressure environment generates a greater magnetic flux than the other magnets to cause the density of magnetic flux passing through said knife edge of said pole piece nearest to the low pressure environment to be greater than through the knife edges of said other pole pieces, thus providing a stronger sealing effect adjacent said low pressure environment.

7. A magnetic fluid sealing device comprising a housing disposed between a low pressure environment and a high pressure environment;

a plurality of annular permanent magnets mounted in said housing coaxially of each other with the polarity of the opposite surfaces of two adjoining magnets being the same;

a plurality of annular pole pieces mounted in said housing in alternating manner with said magnets, each pole piece having a pair of annular knife edges on an inner periphery; and a shaft of magnetic material rotatably mounted in said housing and passing through said magnets and said pole piece in concentric relation wherein each magnet generates magnetic flux which passes through only one knife edge of an adjacent pole piece for capturing a ring of magnetic fluid between said one knife edge and said shaft and said magnet closest to the low pressure environment generating a greater magnetic flux than the other of said magnets whereby the density of magnetic flux passing through said knife edge closest to the low pressure environment is greater than through the other of said knife edges, thus providing a stronger sealing effect adjacent said low pressure environment.

* * * * *

UNITED STATES PATENT AND TRADEMARK OFFICE
CERTIFICATE OF CORRECTION

PATENT NO. : 4,605,233

DATED : August 12, 1986

INVENTOR(S) : Kimio Sato

Page 1 of 3

It is certified that error appears in the above-identified patent and that said Letters Patent is hereby corrected as shown below:

ABSTRACT, line 9, change "more increased" to --increased more--.

Column 1, line 48, change "N.S-polepiece-S.N-" to --N·S-polepiece-S·N---.

Column 1, line 49, change "polepiece-N.S"." to --polepiece-N·S".--.

Column 2, line 23, change "triangule" to --triangle--.

Column 3, line 17, change "in" to --is--.

Column 3, lines 38 and 39, align as follows:

--In the accompanying drawings:--

--FIG. 1 is a side view, in longitudinal secion, of an-- instead of

--In the accompanying drawings--

--FIG. 1 is a side view, in longitudinal section, of an--

UNITED STATES PATENT AND TRADEMARK OFFICE
CERTIFICATE OF CORRECTION

PATENT NO. : 4,605,233

DATED : August 12, 1986

INVENTOR(S) : Kimio Sato

Page 2 of 3

It is certified that error appears in the above-identified patent and that said Letters Patent is hereby corrected as shown below:

Column 4, line 9, omit the words "each other".

Column 4, line 11, change "N.S-polepiece-S.N-" to --N·S-polepiece-S·N---.

Column 4, line 62, omit the word "for".

Column 5, line 7, change "leftest" to --leftmost--.

Column 5, line 10, change "of other magnets" to --of the other magnets--.

Column 5, line 32, change "leftest" to --leftmost--.

Column 5, line 51, change "leftest" to --leftmost--.

Column 5, line 52, omit the word "an" at the end of the line.

Column 6, line 15, change "accommodated" to --contained--.

UNITED STATES PATENT AND TRADEMARK OFFICE
CERTIFICATE OF CORRECTION

PATENT NO. : 4,605,233

DATED : August 12, 1986

INVENTOR(S) : Kimio Sato

It is certified that error appears in the above-identified patent and that said Letters Patent is hereby corrected as shown below:

Column 6, line 17, change "That" to --This--.

Signed and Sealed this

Thirty-first Day of March, 1987

Attest:

DONALD J. QUIGG

Attesting Officer

Commissioner of Patents and Trademarks